US009599164B1

(12) United States Patent
Rode et al.

(10) Patent No.: US 9,599,164 B1
(45) Date of Patent: Mar. 21, 2017

(54) SYSTEMS AND METHODS FOR PRELOADING A BEARING

(71) Applicant: TEMPER AXLE PRODUCTS CORPORATION, Fonda, NY (US)

(72) Inventors: John E. Rode, Fonda, NY (US); Sean E. Strait, Fort Plain, NY (US)

(73) Assignee: TEMPER AXLE PRODUCTS, CORPORATION, Fonda, NY (US)

( * ) Notice: Subject to any disclaimer, the term of this patent is extended or adjusted under 35 U.S.C. 154(b) by 0 days.

(21) Appl. No.: 15/071,584

(22) Filed: Mar. 16, 2016

(51) Int. Cl.
| | |
|---|---|
| F16C 35/063 | (2006.01) |
| F16C 43/04 | (2006.01) |
| B25B 27/20 | (2006.01) |
| B60B 27/00 | (2006.01) |
| B60B 31/00 | (2006.01) |
| F16C 19/54 | (2006.01) |

(52) U.S. Cl.
CPC ............ *F16C 35/063* (2013.01); *F16C 43/04* (2013.01); *B25B 27/205* (2013.01); *B60B 27/0078* (2013.01); *B60B 31/00* (2013.01); *F16C 19/547* (2013.01); *F16C 2229/00* (2013.01); *F16C 2326/02* (2013.01)

(58) Field of Classification Search
CPC ..... B25B 7/12; B25B 27/205; Y10T 29/5363; F16B 39/10; F16B 3/06; F16B 21/16; F16C 35/063; B60B 27/0078
See application file for complete search history.

(56) References Cited

U.S. PATENT DOCUMENTS

| | | | |
|---|---|---|---|
| 518,328 | A | 4/1894 | Oakley |
| 578,276 | A | 2/1897 | Strauss |
| 1,352,643 | A | 9/1920 | Young |
| 1,366,273 | A | 1/1921 | Nettlefold |
| 1,373,489 | A | 5/1921 | Royal-Cochran |
| 1,384,655 | A | 7/1921 | Allmon |

(Continued)

FOREIGN PATENT DOCUMENTS

| | | |
|---|---|---|
| DE | 3905385 A1 | 8/1990 |
| EP | 1367299 A2 | 3/2003 |

(Continued)

OTHER PUBLICATIONS

International Search Report and Written Opinion from Corresponding PCT International Application No. PCT/US2014/050386 filed Aug. 8, 2015, completed and mailed on Dec. 26, 2014.

(Continued)

*Primary Examiner* — Jacob Cigna
(74) *Attorney, Agent, or Firm* — Heslin Rothenberg Farley & Mesiti P.C.; Nicholas Mesiti, Esq.; Victor A. Cardona, Esq.

(57) ABSTRACT

A tool for use in preloading a bearing includes a plurality of arms pivotable relative to each other and a pin extending from each arm of a plurality of arms. The pin is configured to engage an opening of a plurality of openings in a retaining ring. A resilient member biases the plurality of arms away from each other. A first arm of the plurality of arms includes a cavity. A second arm of the plurality of arms is received in the cavity such that an extending portion of the second arm extends outside the cavity and the second arm is moveable in the cavity.

5 Claims, 14 Drawing Sheets

(56) References Cited

U.S. PATENT DOCUMENTS

| | | | |
|---|---|---|---|
| 1,440,938 A | 2/1923 | Sieroslawski | |
| 1,755,807 A | 4/1930 | Boles | |
| 1,758,515 A | 5/1930 | Heiermann | |
| 2,301,786 A | 11/1942 | Millermaster | |
| 2,426,219 A | 8/1947 | Jackson | |
| 2,532,141 A * | 11/1950 | Barkan | B25B 27/205 29/224 |
| 2,553,620 A * | 5/1951 | Yeazell | B25B 27/205 29/229 |
| 2,755,698 A | 7/1956 | Wurzel | |
| 2,769,360 A | 11/1956 | Woodford | |
| 2,813,732 A | 11/1957 | Hird | |
| 3,144,909 A | 8/1964 | Hart et al. | |
| 3,241,409 A | 3/1966 | Raptis | |
| 3,316,952 A | 5/1967 | Hollinger | |
| 3,390,445 A * | 7/1968 | Sova, Sr. | B25B 27/205 29/229 |
| 3,464,474 A | 9/1969 | Jansen | |
| 3,480,300 A | 11/1969 | Jeffrey et al. | |
| 3,522,830 A | 8/1970 | Blizard | |
| 3,566,721 A * | 3/1971 | Nockleby | B25B 9/00 81/384 |
| 3,581,609 A | 6/1971 | Greenwood | |
| 3,620,108 A * | 11/1971 | Door | B25B 7/12 81/303 |
| 3,662,449 A * | 5/1972 | Hashimoto | B25B 27/205 29/229 |
| 3,664,226 A | 5/1972 | Gonzalez | |
| 3,678,981 A | 7/1972 | Heyworth | |
| 3,742,568 A | 7/1973 | Hahlbeck | |
| 3,762,455 A * | 10/1973 | Anderson, Jr. | F16B 39/10 411/190 |
| 3,844,323 A | 10/1974 | Anderson, Jr. | |
| 3,986,750 A | 10/1976 | Trent et al. | |
| 4,004,338 A * | 1/1977 | Breitbach | B25B 7/12 29/229 |
| 4,019,824 A * | 4/1977 | Percy | F16B 3/06 403/261 |
| 4,048,897 A | 9/1977 | Price, Jr. | |
| 4,054,999 A | 10/1977 | Harbottle | |
| 4,210,372 A | 7/1980 | McGee et al. | |
| 4,305,438 A | 12/1981 | Spinosa et al. | |
| 4,436,468 A | 3/1984 | Ozaki et al. | |
| 4,593,924 A | 6/1986 | Cabeza | |
| 4,689,865 A * | 9/1987 | Chamblee | B25B 27/205 29/229 |
| 4,812,094 A | 3/1989 | Grube | |
| 4,958,941 A | 9/1990 | Imanari | |
| 4,971,501 A | 11/1990 | Chavez | |
| 5,011,306 A | 4/1991 | Martinie | |
| 5,058,424 A | 10/1991 | O'Hara | |
| 5,070,621 A | 12/1991 | Butler et al. | |
| 5,129,156 A | 7/1992 | Walker | |
| 5,180,265 A | 1/1993 | Wiese | |
| 5,251,995 A | 10/1993 | Chi | |
| 5,348,349 A | 9/1994 | Sloane | |
| 5,349,736 A | 9/1994 | Rubino et al. | |
| 5,362,111 A | 11/1994 | Harbin | |
| 5,366,300 A | 11/1994 | Deane et al. | |
| 5,533,849 A | 7/1996 | Burdick | |
| 5,535,517 A | 7/1996 | Rode | |
| 5,573,311 A | 11/1996 | Clohessy | |
| 5,597,058 A | 1/1997 | Ewer | |
| 5,749,386 A | 5/1998 | Samuel, Jr. | |
| 5,877,433 A | 3/1999 | Matsuzaki et al. | |
| 5,882,044 A | 3/1999 | Sloane | |
| 5,934,853 A | 8/1999 | Junkers | |
| 6,042,273 A | 3/2000 | Thrasher | |
| 6,058,767 A | 5/2000 | Calvin | |
| 6,065,920 A | 5/2000 | Becker et al. | |
| 6,095,735 A | 8/2000 | Weinstein et al. | |
| 6,135,642 A | 10/2000 | Burch | |
| 6,186,032 B1 | 2/2001 | Raines | |
| 6,286,374 B1 | 9/2001 | Kudo et al. | |
| 6,520,710 B2 | 2/2003 | Wells | |
| 6,598,500 B1 | 7/2003 | Chivington-Wells | |
| 6,601,503 B2 | 8/2003 | Scholzig et al. | |
| 6,622,397 B1 | 9/2003 | Knoble | |
| 6,637,297 B1 | 10/2003 | Mlynarczyk | |
| 6,749,386 B2 | 6/2004 | Harris | |
| 6,857,665 B2 | 2/2005 | Vyse et al. | |
| 6,886,227 B1 | 5/2005 | Hedrick | |
| 6,971,802 B2 | 12/2005 | Vezina | |
| 6,976,817 B1 | 12/2005 | Grainger | |
| 6,988,832 B2 | 1/2006 | DeWachter | |
| 6,993,852 B2 | 2/2006 | Russell et al. | |
| 7,303,367 B2 | 12/2007 | Rode | |
| 7,343,836 B1 | 3/2008 | Ward | |
| 7,346,985 B1 | 3/2008 | Strait | |
| 7,389,579 B2 | 6/2008 | Rode | |
| 7,428,779 B2 | 9/2008 | Smith et al. | |
| 7,559,135 B2 | 7/2009 | Rode | |
| 7,625,164 B2 | 12/2009 | Rode | |
| 7,927,052 B1 | 4/2011 | Varden | |
| 8,006,573 B1 | 8/2011 | Rode | |
| 8,316,530 B2 | 11/2012 | Rode | |
| 8,328,486 B2 | 12/2012 | Cox | |
| 8,534,770 B2 * | 9/2013 | White | B60B 27/02 301/105.1 |
| 8,650,757 B2 | 2/2014 | Rode | |
| 8,904,646 B2 | 12/2014 | Rode | |
| 8,961,090 B2 | 2/2015 | Rode | |
| 9,217,461 B2 | 12/2015 | Rode | |
| 2002/0110414 A1 | 8/2002 | Wells | |
| 2003/0035699 A1 | 2/2003 | Harris | |
| 2004/0086354 A1 | 5/2004 | Harris | |
| 2004/0089113 A1 | 5/2004 | Morgan | |
| 2005/0025604 A1 | 2/2005 | Slesinski | |
| 2005/0207865 A1 | 9/2005 | Disantis et al. | |
| 2006/0008340 A1 | 1/2006 | Cox | |
| 2007/0177829 A1 * | 8/2007 | Rode | B25B 27/062 384/7 |
| 2009/0003963 A1 | 1/2009 | Winker et al. | |
| 2010/0326205 A1 | 12/2010 | Rode | |
| 2011/0097174 A1 | 4/2011 | Varden | |

FOREIGN PATENT DOCUMENTS

| | | |
|---|---|---|
| GB | 990553 A | 4/1965 |
| GB | 2286231 A | 6/1995 |
| GB | 2435499 B | 8/2007 |
| GB | 2434621 B | 10/2008 |
| WO | 02/08618 A1 | 1/2002 |
| WO | 0208618 A1 | 1/2002 |
| WO | 2015/147903 A1 | 10/2015 |

OTHER PUBLICATIONS

Search Report for related application GB0701360.0 received Mar. 22, 2007.

Examiner's Report for related application AU2007200331 recieved Mar. 19, 2007.

"STEMCO Pro-Torq® Advanced Axle Spindle Nuts 09-571-0006," Instruction guide, Copyright Aug. 2003, 2 pages.

"STEMCO Pro-torq(R) 571-2970," Copyright 2005 STEMCO LP, 2 pages.

"Timkin Products—Bearings," vol. 1, Issue 6: 2 pages, [http://www.timkin.com/products/bearings/techtips/tip6.asp].

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preloa.

"Forming and Shaping Processes Compaction and Sintering (Pulvepresning)," Copyright Institut for Precesteknik Danmarks Tekniske Universitet 1996, (http://www.ipt.dtusdk/—ap/ingpro/forming/ppm/htm.)

STEMCO, Pro-Torq, An Axle Spindle Nut System for Today's Fleets. Mar. 2003; download from http://www.stemco.com, pp. 38-41.

(56) References Cited

OTHER PUBLICATIONS

STEMCO, Pro-Torq, An Axle Spindle Nut System for Today's Fleets. Mar. 2003; download from http://www.stemco.com, pp. 57-64.
GB Intellectual Property Office Search Report Under Section 17, dated Aug. 25, 2010, from corresponding GB Application No. 1008927.4.
What is Powder Metallurgy? Dec. 2004, 2 pages. (htttps://www.mpif org/technology/whatis.html).
Stemco, Quick Reference Catalog 572-001 Rev. Date Apr. 2010.
Stemco—Pro-Torq, Axle Spindle Nuts, An Axle Spindle Nut System for Today's Commercial Fleets (http://www.stemco.com/product/pro-torz-axle-spindle-nuts/.

* cited by examiner

SYSTEMS AND METHODS FOR PRELOADING A BEARING

CROSS-REFERENCE TO RELATED APPLICATION

This application is related to U.S. Ser. No. 12/492,826 filed on Jun. 26, 2009, entitled "Systems and Methods for Preloading a Bearing and Aligning a Lock Nut", now U.S. Pat. No. 8,316,530 issued on Nov. 27, 2012, the entire disclosure of which is incorporated herein by reference.

This application also relates to U.S. Ser. No. 13/683,571, filed on Nov. 21, 2012, entitled "Methods for Preloading a Bearing and Aligning a Lock Nut", now U.S. Pat. No. 8,650,752 issued on Feb. 18, 2014, the entire disclosure of which is incorporated herein by reference.

This application also relates to U.S. Ser. No. 14/160,045, filed on Jan. 21, 2015, entitled "Systems and Methods for Preloading a Bearing and Aligning a Lock Nut", now U.S. Pat. No. 8,904,646 issued on Dec. 9, 2014, the entire disclosure of which is incorporated herein by reference.

This application also relates to U.S. application Ser. No. 11/341,948, filed Jan. 27, 2006, and titled "Method and Apparatus for Preloading a Bearing", issued as U.S. Pat. No. 7,559,135 on Jul. 14, 2009, the entire disclosure of which is incorporated herein by reference.

This application also relates to U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, the entire disclosure of which is incorporated herein by reference.

This application also relates to U.S. Ser. No. 12/033,548, filed on Feb. 19, 2008, entitled "Axle Nut", now U.S. Pat. No. 8,961,090 issued on Feb. 24, 2015, the entire disclosure of which is incorporated herein by reference.

This application also relates to U.S. Ser. No. 12/492,926, filed Jun. 26, 2009, entitled "Methods for Preloading a Bearing", now U.S. Pat. No. 8,359,733 issued on Jan. 29, 2013, the entire disclosure of which is incorporated herein by reference.

This application also relates to U.S. Ser. No. 14/305,830, filed Jun. 16, 2014, entitled "Lock Nut System", published as U.S. Publication Number US 2014/0294531 on Oct. 2, 2014, the entire disclosure of which is incorporated herein by reference.

This application also relates to U.S. Ser. No. 14/305,673, filed Jun. 16, 2014, entitled "Method, Apparatus, and Nut for Preloading A Bearing", published as U.S. Publication Number US 2014/0290065 on Oct. 2, 2014, the entire disclosure of which is incorporated herein by reference.

This application also relates to U.S. Ser. No. 14/814,086, filed Jul. 30, 2015, entitled "Apparatus for Preloading A Bearing", the entire disclosure of which is incorporated herein by reference.

This application also relates to U.S. Ser. No. 14/852,100, filed Sep. 11, 2015, entitled "Method, Apparatus, and Nut for Bearing", the entire disclosure of which is incorporated herein by reference.

This application is also related to U.S. Ser. No. 14/533,143, filed on Aug. 8, 2014, entitled "Systems and Methods for Preloading A Bearing and Aligning A Lock Nut", the entire disclosure of which is incorporated by reference);

This application also relates to U.S. Ser. No. 15/071,570, filed concurrently herewith entitled "Systems and Methods for Preloading a Bearing and Aligning a Lock Nut", the entire disclosure of which is incorporated herein by reference.

This application also relates to U.S. Ser. No. 15/071,753, filed concurrently herewith entitled "Systems and Methods for Preloading a Bearing", the entire disclosure of which is incorporated herein by reference.

This application is also related to U.S. Design application Ser. No. 29/558,261, entitled "Retaining Ring Pliers", filed on Mar. 16, 2016, the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as" a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft. Insertion and engagement of the locking member and the nut may be limited by the tools used for such manipulation. Often the locking member is engaged using a pair of general use pliers that is not adapted to perform the task of engaging the locking member and nut.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect, a tool for use in preloading a bearing which includes a plurality of arms pivotable relative to each other and a pin extending from each arm of a plurality of arms. The pin is configured to engage an opening of a plurality of openings in a retaining ring. A resilient member biases the plurality of arms away from each other. A first arm of the plurality of arms includes a cavity. A second arm of the plurality of arms is received in the cavity such that an extending portion of the second arm extends outside the cavity and the second arm is moveable in the cavity.

The present invention provides, in a second aspect, a lock nut system which includes a nut and a keeper engageable with the nut to inhibit movement of the keeper relative to the nut. The keeper has a radially inner side configured to engage a shaft to inhibit rotational movement of the nut relative to the shaft when the keeper engages the nut and the radially inner side engages the shaft. A keeper retaining member is secured to the keeper and the retaining member is engageable with the nut to hold the keeper axially such that the keeper is engaged with the nut. A retaining member tool has a plurality of arms pivotable relative to each other. A pin extends from each arm of the plurality of arms and the pin is configured to engage an opening of a plurality of openings in the retaining member. A first arm of the plurality of arms includes a cavity. A second arm of the plurality of arms is received in the cavity such that an extending portion of the second portion extends outside the cavity and the second arm is moveable in the cavity.

The present invention provides, in a third aspect, a method for use in providing a load on a bearing mounted to a shaft which includes engaging a lock nut on a shaft at a desired preload of a bearing mounted on the shaft. A keeper is engaged with the nut to inhibit movement of the keeper relative to the nut. A first pin of a first arm of a retaining member tool is engaged with a first tool receiving opening of a retaining member connected to the keeper. A second pin of a second arm of the retaining member tool is engaged with a second tool receiving opening of the retaining member. The first arm is moved toward the second arm to deform the retaining member such that opposite member arms of the retaining member moved toward each other and the second arm is received in a cavity of the first arm such that an extending portion of the second arm extends outside the cavity and the second arm moves within the cavity. The retaining member connected to the keeper is engaged with the nut to hold the keeper axially such that the keeper is engaged with the nut.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
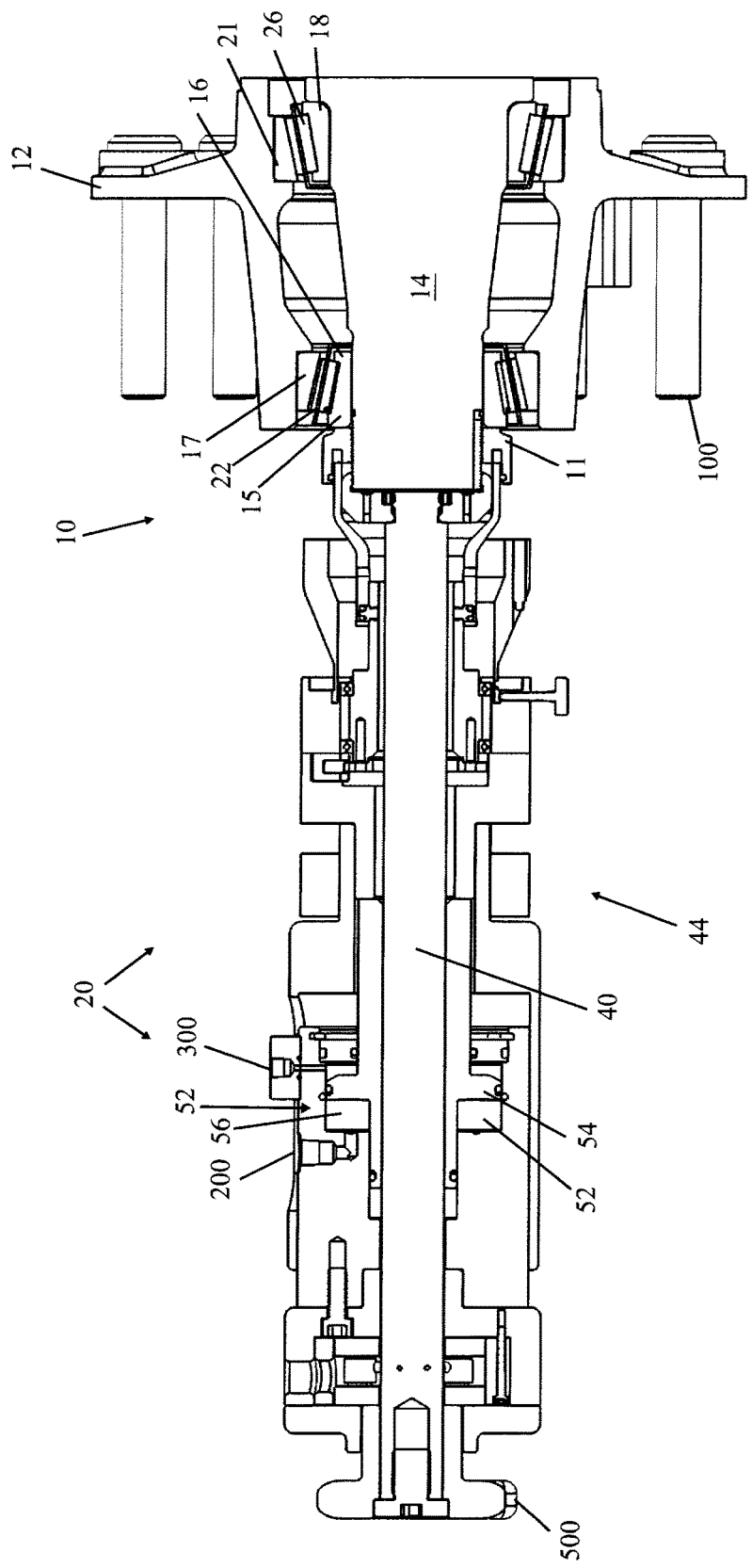
FIG. 1 is a right side elevation view, partially in cross section, of wheel hub assembly engaging a bearing preload apparatus according to one aspect of the invention.

In accordance with the principals of the present invention, system and methods for adjusting bearings mounted on a shaft and aligning lock nuts for retaining such bearings are provided.

In an exemplary embodiment depicted in FIGS. 1-4, a wheel hub assembly 10 engages a bearing preload apparatus 20. Some of a section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIG. 1-4, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

Figure 2:
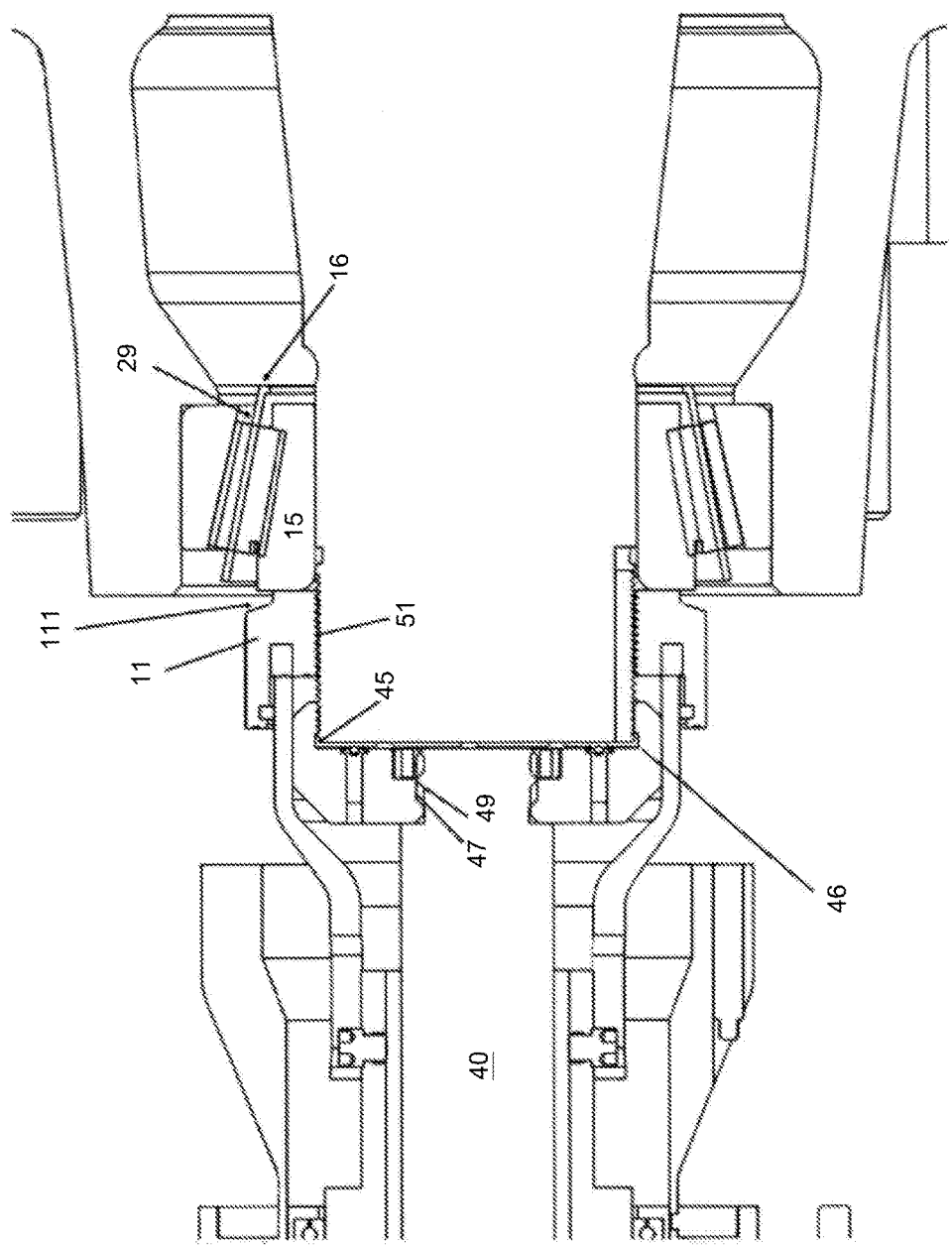
FIG. 2 is a close up view of a portion of FIG. 1.
Figure 3:
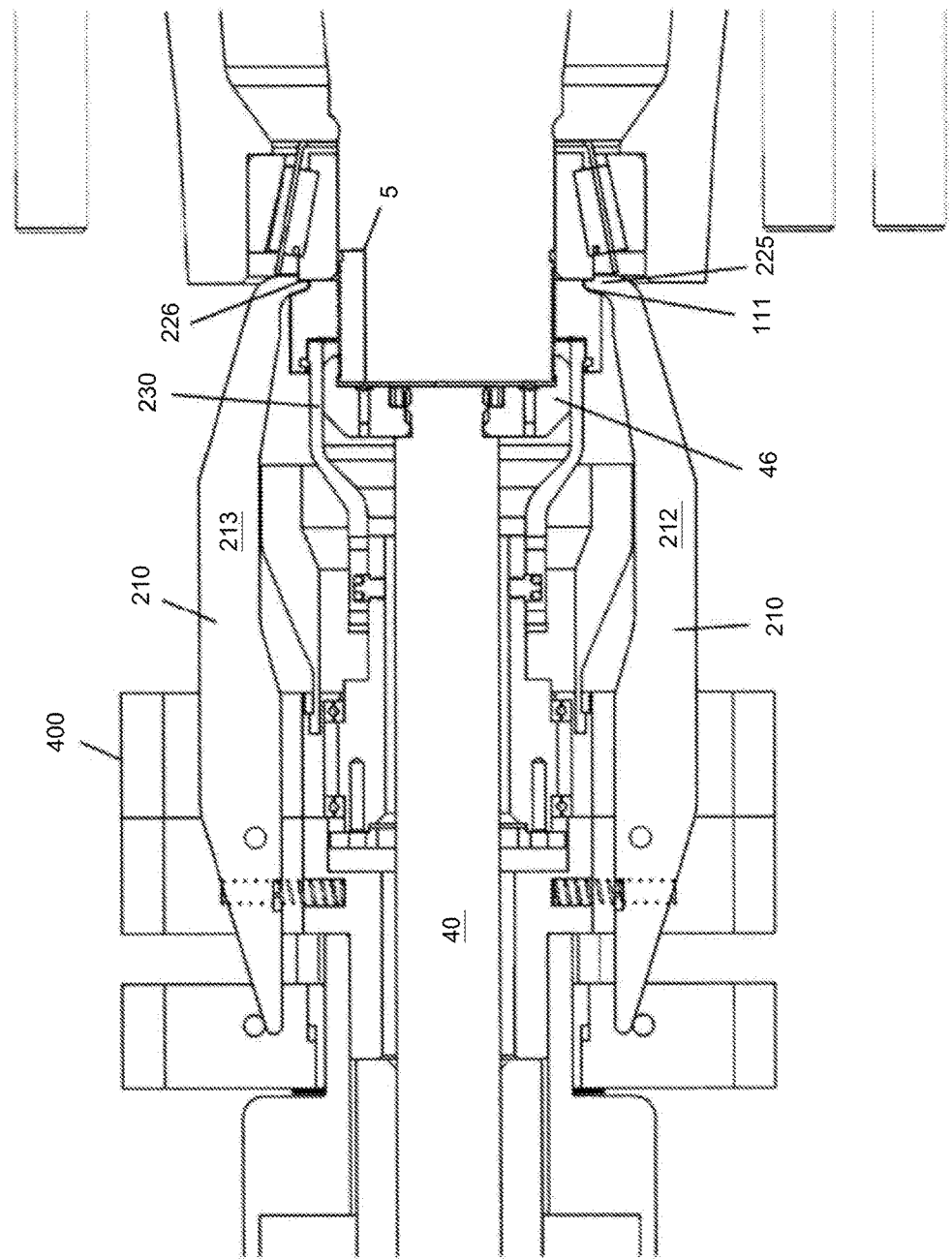
FIG. 3 is a top plan view, partially in cross section of a portion of the assembly shown in FIG. 1.

As shown in FIGS. 1-3, as is typical of bearings, an outboard bearing 16 includes an inner race (or cone) 15, an outer race (or cup) 17, a plurality of rollers 22, and a roller cage. Similarly, an inboard bearing includes an inner race (or cone) 18, an outer race (or cup) 21, a plurality of rollers 26, and roller cage. As shown in FIG. 2, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 1-6, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 4:
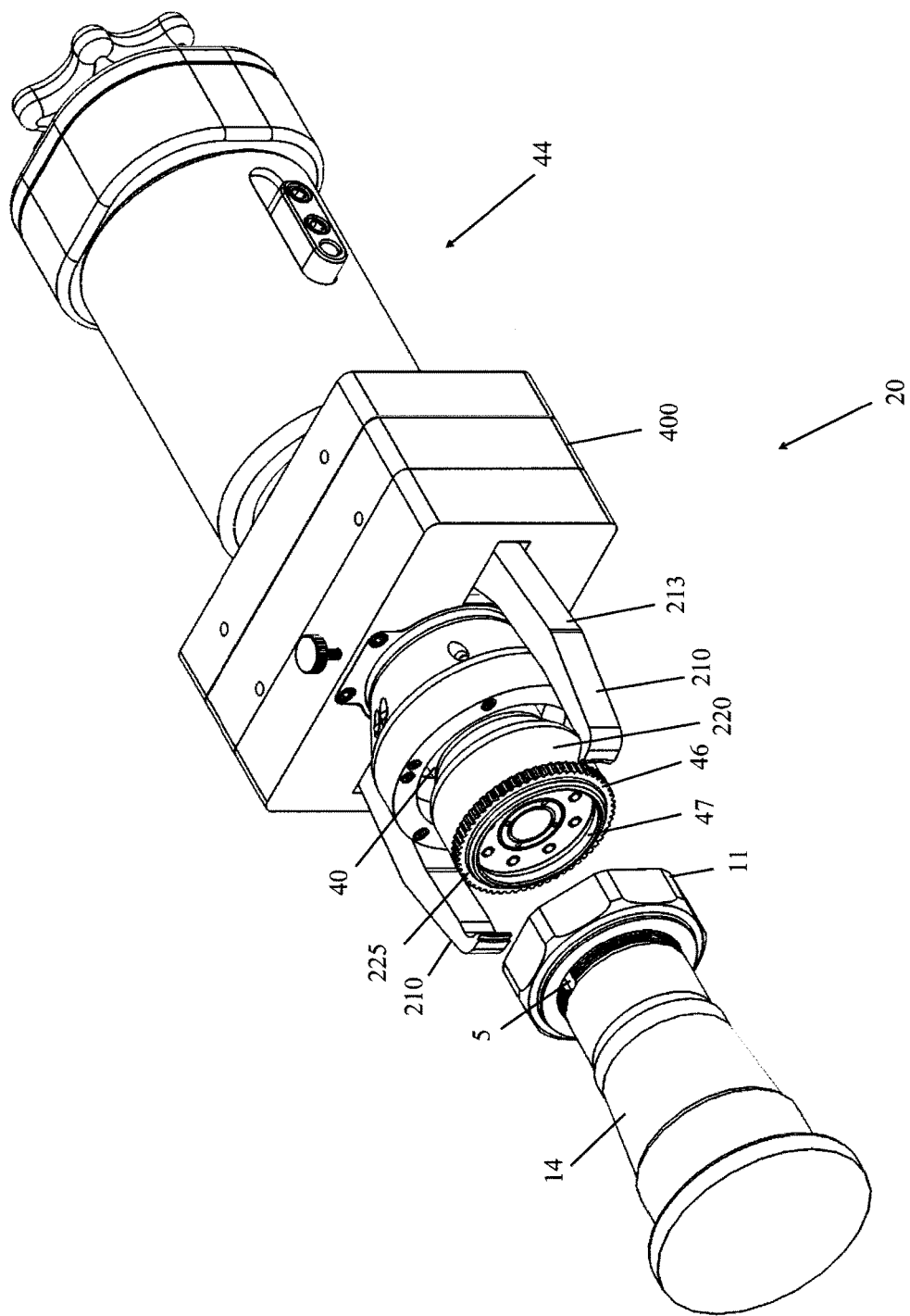
FIG. 4 is an exploded perspective view of the assembly of FIG. 1 with portions of the wheel hub assembly removed.
Figure 5:
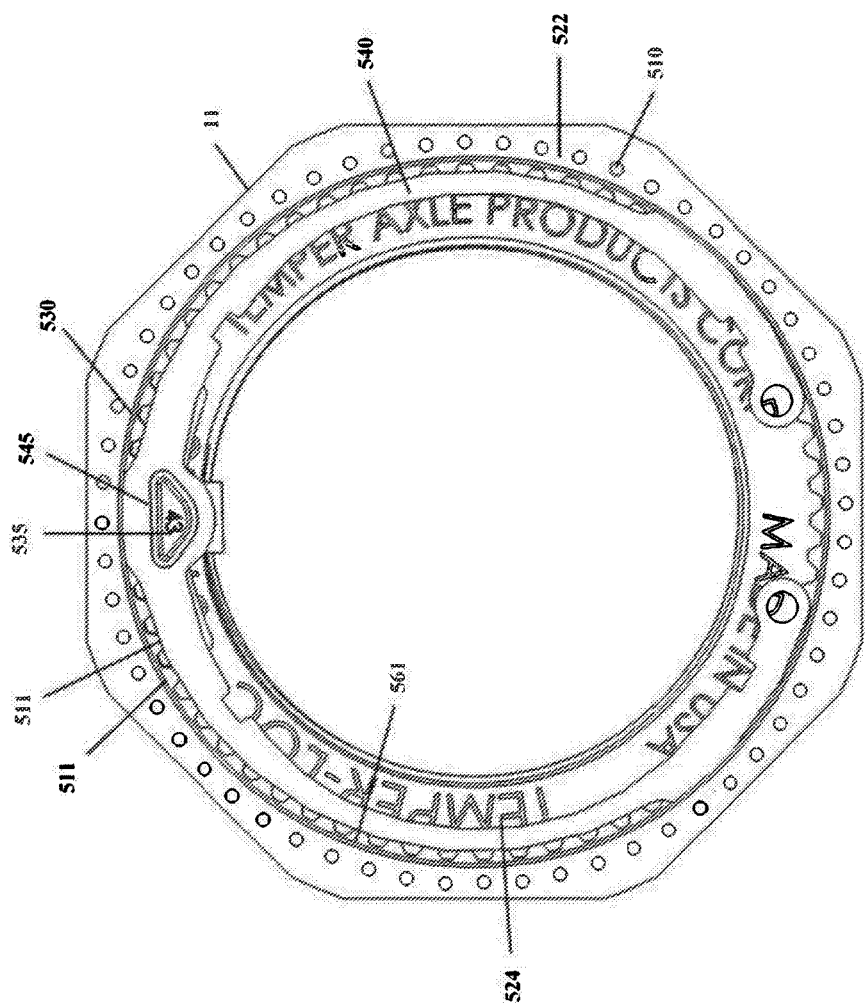
FIG. 5 is an elevational view of a lock nut system which includes a lock nut having a keeper and a keeper retaining member engaged with the nut according to an aspect of the present invention.
Figure 6:
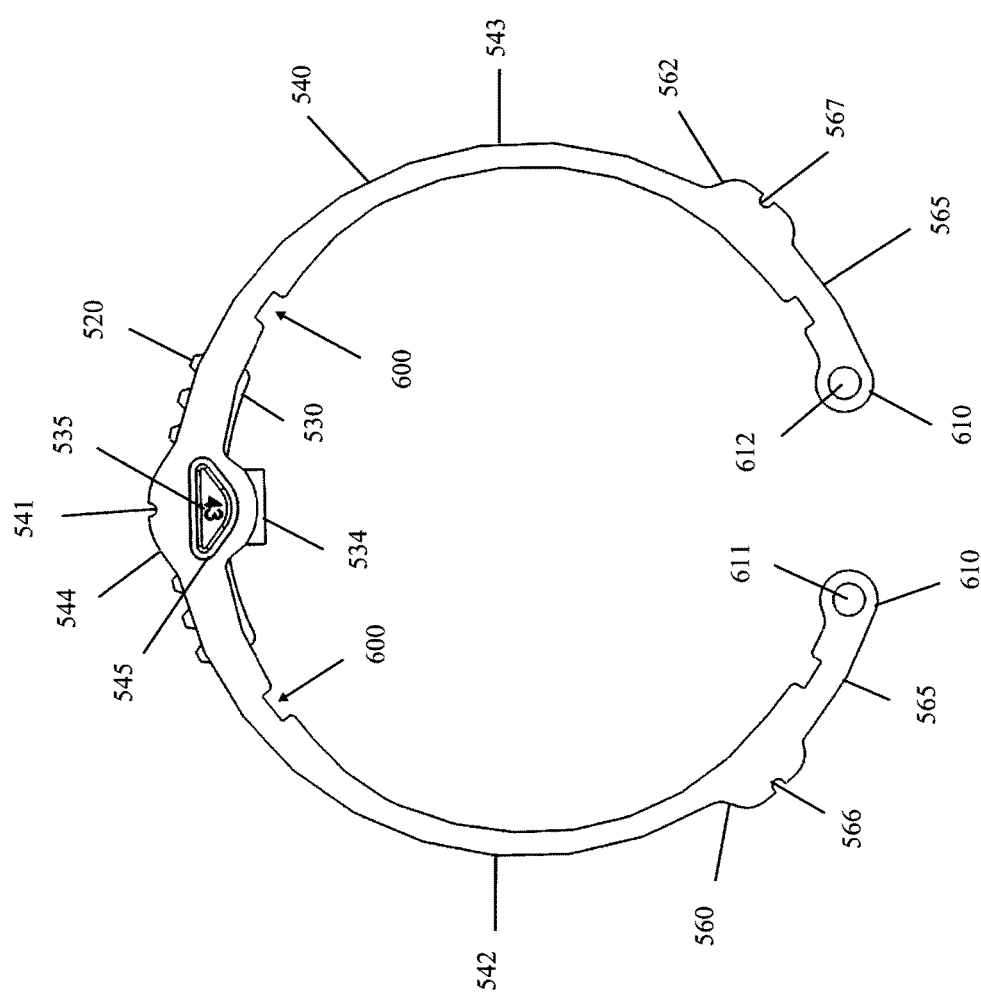
FIG. 6 is an elevational view of the keeper retaining member of FIG. 5.

As depicted in FIGS. 5-6, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIGS. 4-5), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member.

The gripping members are substantially parallel to one another and are aligned at about 90 degrees from a plane of retaining member 540. A user may move the legs (i.e., first leg 542 and second leg 543) toward one another as described above to allow the retaining member to be received in slot 561. In one example, a user may use a tool (e.g., a type of pliers, such as needle nose pliers) which is inserted into openings 611 and 612 (FIGS. 5-6) of retaining member 540 to allow the tool to grip the legs thereof to move ends 610 toward one another thereby allowing the legs to be inserted into slot 561.

In another example, a tool 700 may include a first arm 710 having a pin 715 extending from a bottom end 717 with pin 715 being configured (e.g., shaped and dimensioned) for engaging openings 611 and 612 (FIGS. 5-6) as described above. A second arm 720 may have a second pin 725 extending from a bottom end 722 of arm 720 and which may be configured (e.g., shaped and dimensioned) for engaging openings 611 and 612 (FIGS. 5-6).

First arm 710 may include a cavity 730 configured to receive second arm 720 such that a portion of second arm projects out of the cavity. In particular a second outer side 740 may be furthest away from cavity 730 while a second inner side 745 may be completely or partially received in cavity 730.

As depicted in FIGS. 7-12, first arm 710 may include a first outer side 750. Tool 700 may be gripped such that a palm portion and/or thumb of a user's hand may contact second outer side 740 while the fingers contact first outer surface 750. Second outer side may also include an arched surface 800 extending from top end 770 toward bottom end 722. First outer surface 750 may also include a curved surface but with less of an arc than second outer side 740 as depicted for example in FIG. 13.

Figure 13:
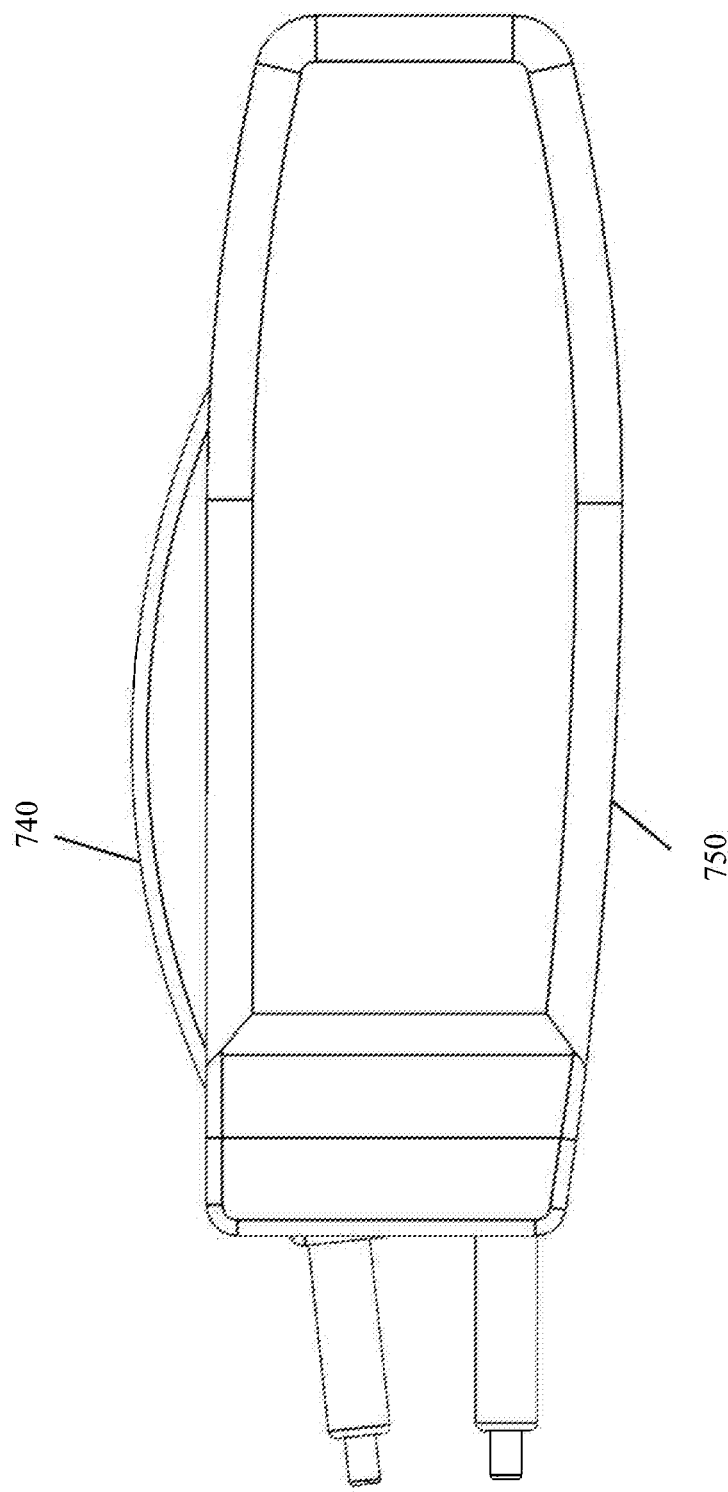
FIG. 13 is a side elevational view of the tool of FIG. 7, with an arm partially received in a cavity of the tool.
Figure 14:
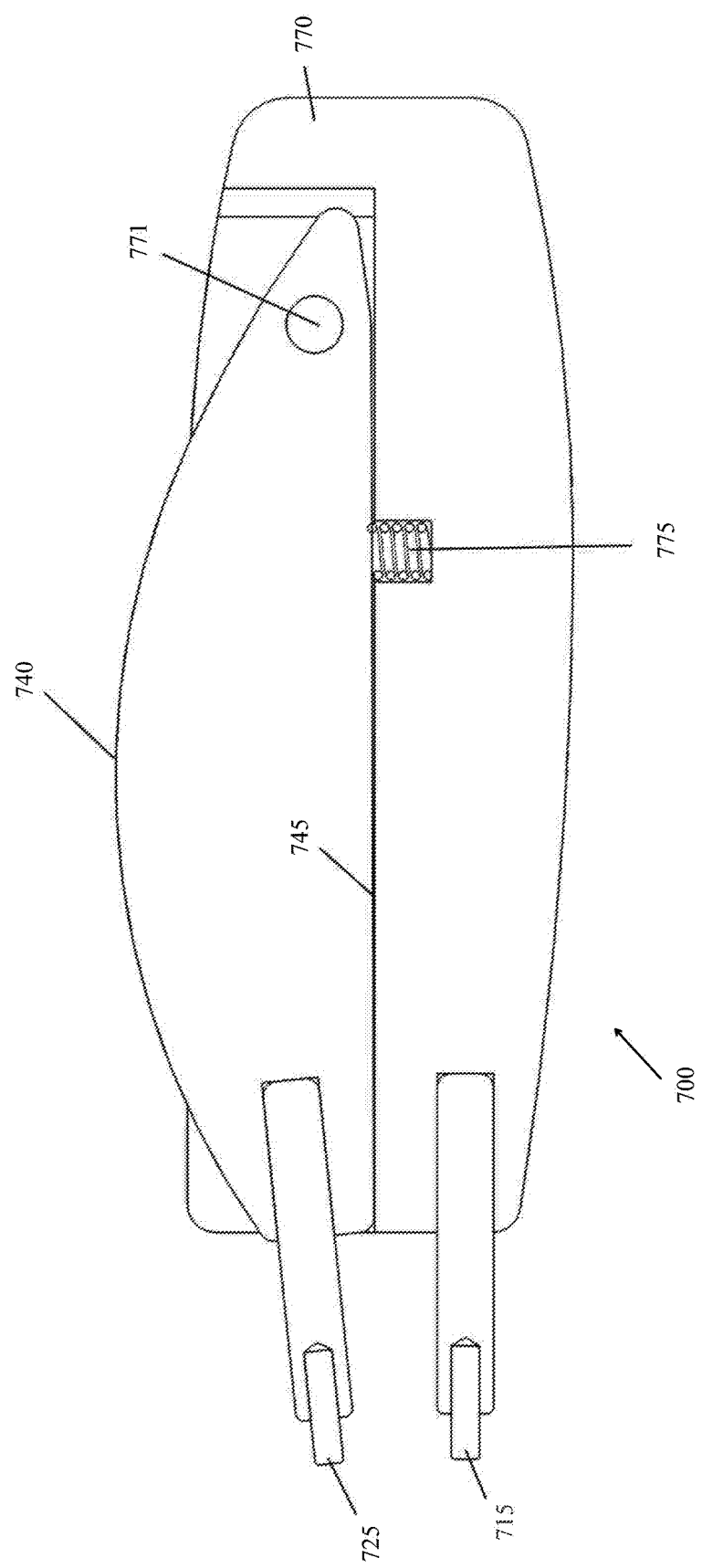
FIG. 14 is a side cross-sectional view of the tool of FIG. 13.

First arm 710 and second arm 720 may be connected to each other such that a user my squeeze the arms toward one another resulting in second arm 720 being received or moving further into cavity 730 of first arm 710 as depicted in FIGS. 13 and 14. For example, first arm 710 and second arm 720 may be pivotally connected to each other at a top end 770. A pin 771 may be connected to (and located between interior surfaces of) both arms to allow a movable connection between them such that end bottom end 717 and bottom end 722 may be moved relative to each other while first arm 710 and second arm 720 remain connected to each other at top end 770. In another example first arm 710 and second arm 720 may be connected to each other via other movable connections to allow such movement between the arms while being connected to each other at one end of such arms.

Figure 8:
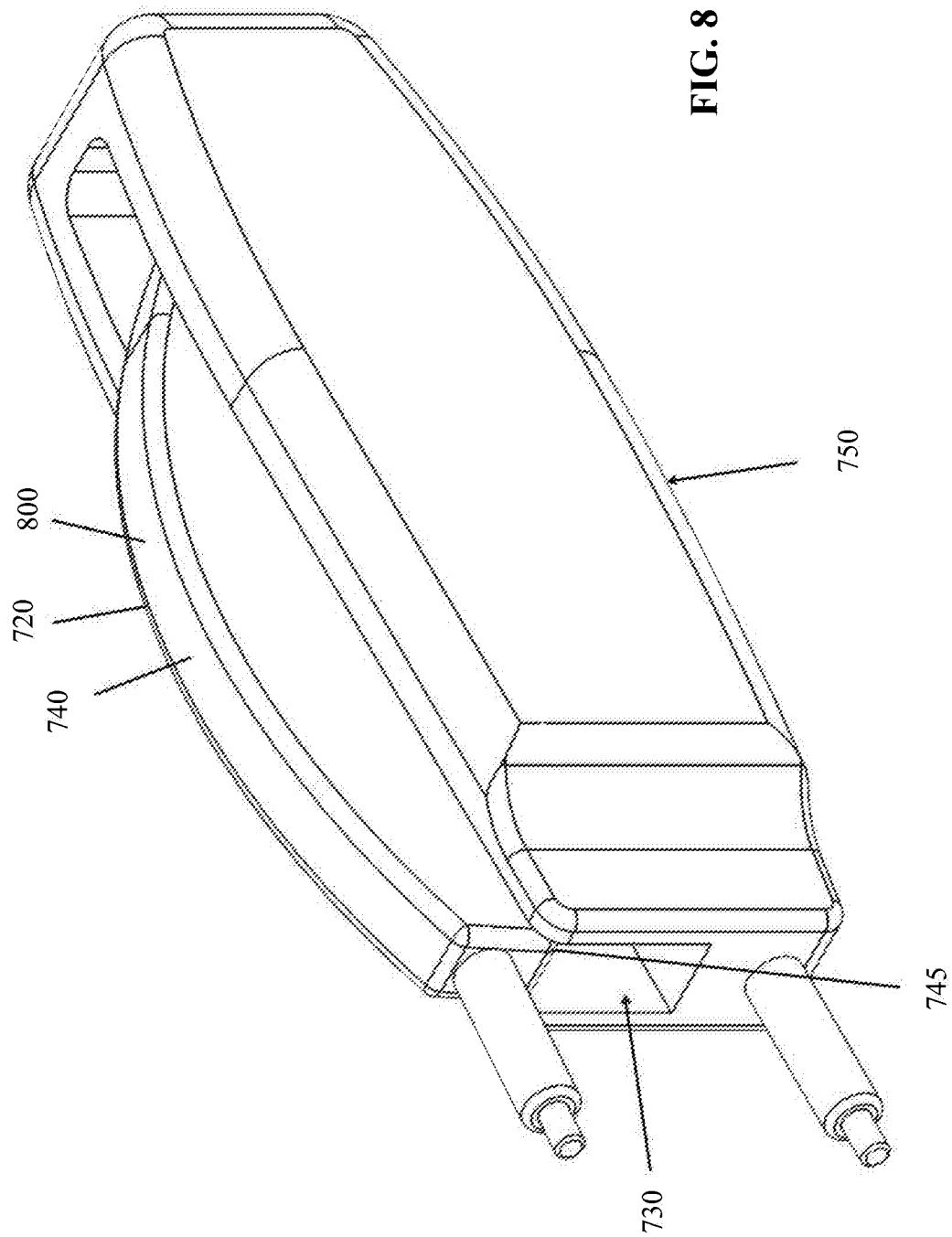
FIG. 8 is a bottom perspective view of the tool of FIG. 7.
Figure 9:
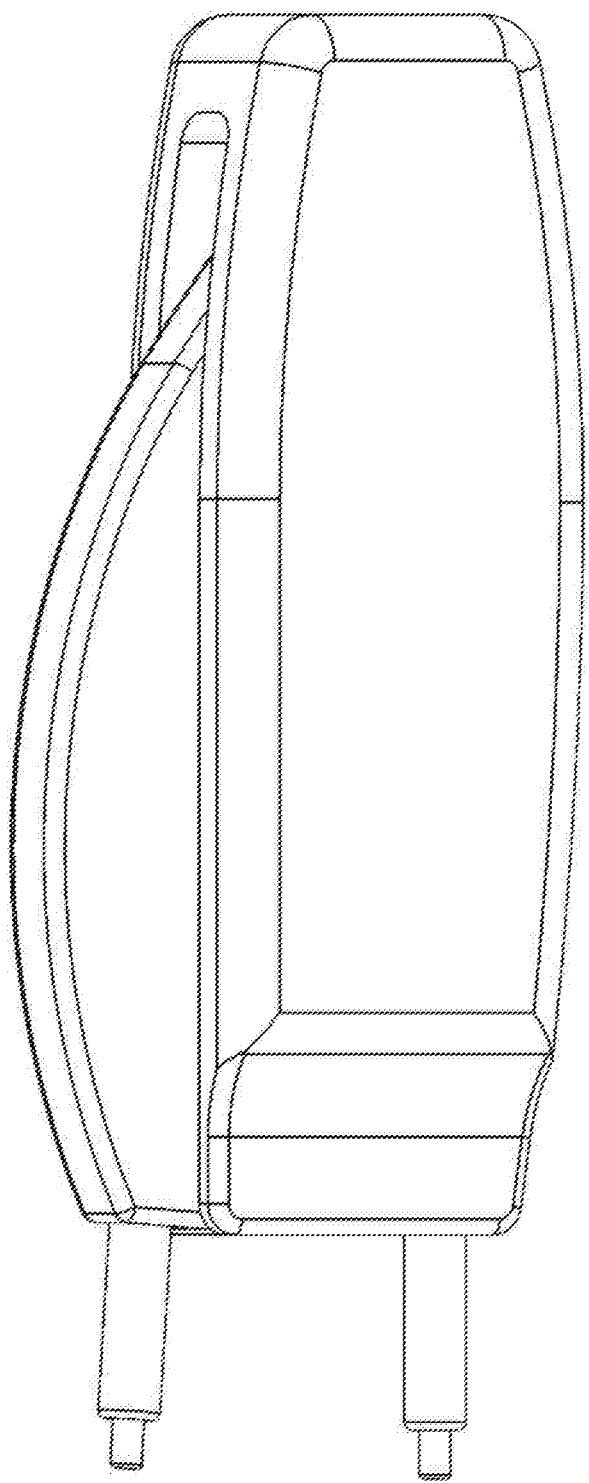
FIG. 9 is a side perspective view of the tool of FIG. 7.
Figure 10:
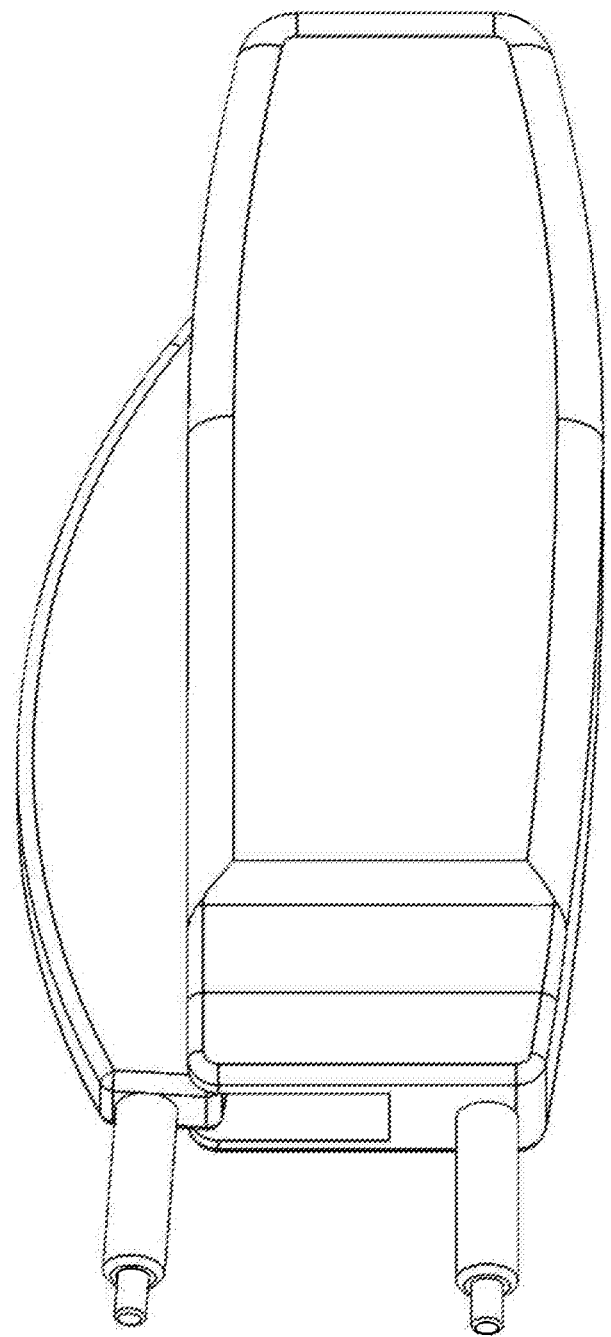
FIG. 10 is a side perspective view of the tool of FIG. 7.
Figure 11:
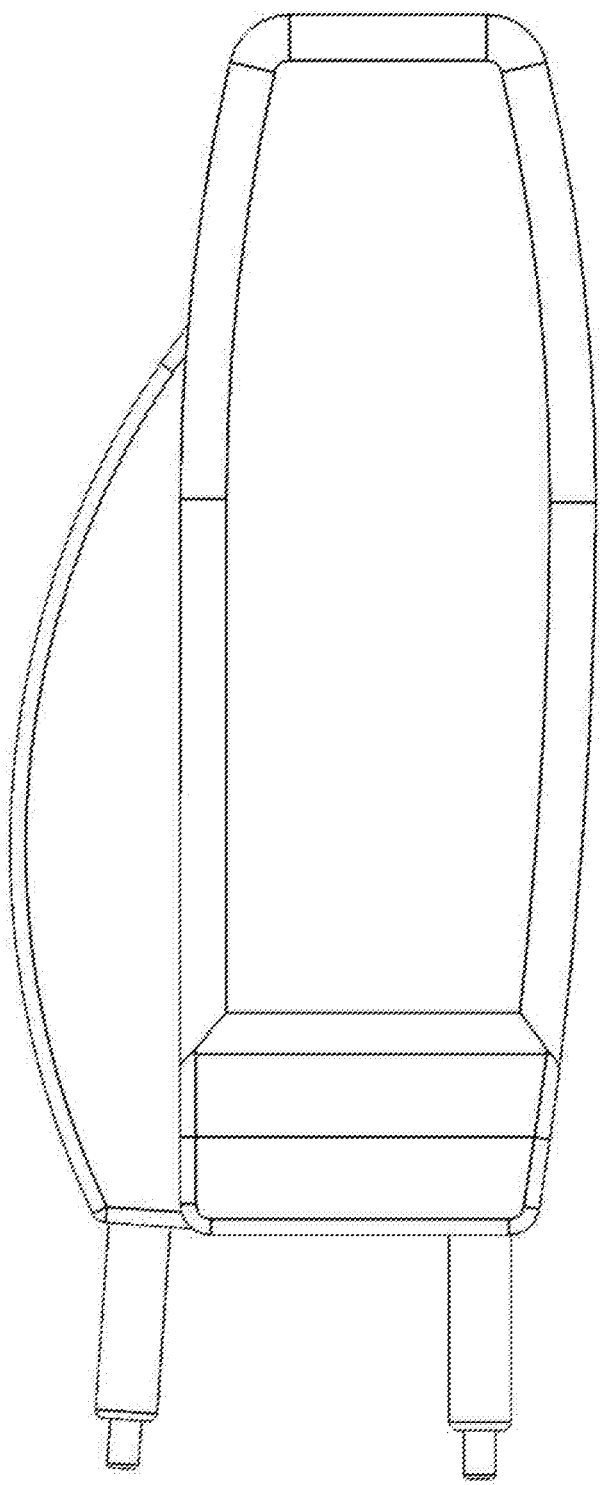
FIG. 11 is a side elevational view of the tool of FIG. 7.
Figure 12:
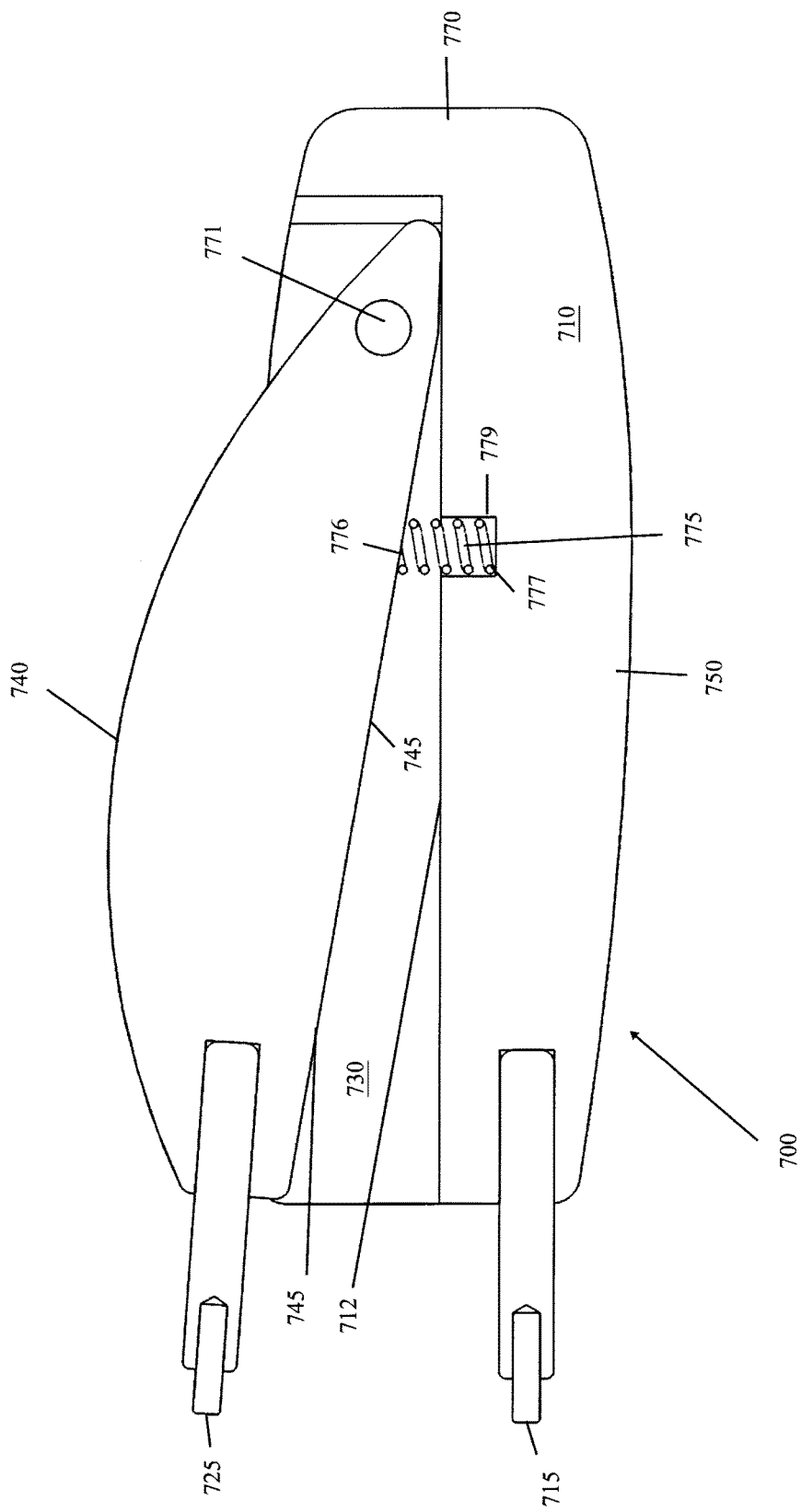
FIG. 12 is a side cross-sectional view of the tool of FIG. 7.

A spring or other resilient member 775 may bias first arm 710 and second arm 720 away from each other such that second arm 720 projects out of cavity 730 as depicted for example in FIG. 8. A first end 777 of spring 775 may be received in a cavity 779 of inner surface 712 of first arm 710 while a second end 776 of spring 775 may be connected to and/or contacting a bottom surface of second arm 720.

As indicated above, the user may squeeze first arm 710 and second arm 720 toward each other such that second arm 720 retreats into cavity 730 and pin 715 and pin 725 move toward each other. The movement of the pins when received in openings 611 and 612 (FIGS. 5-6) allow the tool to move legs (i.e., first leg 542 and second leg 543) of retaining member 540 toward one another thereby allowing the legs to be inserted into slot 561 of nut 11.

Also, first leg 542 may include a protruding portion 560 which protrudes radially relative to a rounded portion 565 of retaining member 540. Similarly, second leg 543 may include a protruding portion 562. Protruding portion 560 and protruding portion 562 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on end 241 of nut 220 may be hardened, for example, induction hardened.

Returning to FIGS. 1-5, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment handle 500 which may be connected to rod 40 to facilitate rotation of rod 40 and/or collar 46 to connect press mechanism 44 to shaft 14. Such connection may also be performed by a servo motor or other mechanism for rotating rod 40 and/or collar 46 to connect press mechanism 44 to shaft 14.

Press mechanism 44 may provide a compression force via a nut as described in co-owned U.S. Pat. No. 8,316,520 relative to a nut 48 depicted therein or via a hydraulic, pneumatic or other means of providing such a force.

As shown in FIGS. 3-4, press mechanism 44 includes loading arms 210. A compressive load from press mechanism is transmitted to bearing 16, and to bearing 18, by loading arms 210. Further, loading arms 210 work in conjunction with retaining nut 11 to provide a load to outboard bearing 16 (e.g., an inner race 15 thereof). Retaining nut 11 may have a recess that exposes the surface of inner race 15 and permits contact by, for example, loading arms 210. For example, as depicted in FIGS. 1-4, nut 11 may have a bottom curve or recessed portion 111 such that a bottom end of nut 11 has a smaller diameter than the remainder thereof. Loading arms 210 may thus transmit the compressive load from press mechanism 44 (i.e., around nut 11) to bearing 16. In an unillustrated example, bearing 16 could be exposed thereby allowing press mechanism 44 to be used with a conventional axle nut, as shown for example in FIG. 3 of co-owned application U.S. Pat. No. 7,389,579. However, when bearing 16 would be concealed by such a conventional axle nut, retaining nut 11 may be used instead thereof according to aspects of the invention.

As depicted in FIGS. 3-4, for example, loading arms 210 extend from a base 400 and include a first arm 212 and a second arm 213. In this aspect of the invention, arms 210 are adapted to transmit a load from press mechanism 44 to the bearing 16. In one aspect, arms 210 may be moveable or deflectable to facilitate assembly of arms 210 into engagement with bearing 16. For example, arms 210 may include a modification to arms 212 and 213 that permits arms 212 and 213 to deflect to avoid interference with nut 11. In an example, arms 210 may be pivotally mounted to base 400 or another portion of press mechanism 44 to allow lateral movement of the arms such that the arms may engage bearing 16. Arms 210 may include projections 225, 226, respectively, for example, arcuate projections adapted to engage the arcuate shape of bearing 16 (e.g., an inner race thereof) as described previously relative to extensions 212, 213 of co-owned U.S. Pat. No. 8,650,757, issued on Feb. 18, 2014, and titled "Methods for Preloading a Bearing and Aligning a Lock Nut". Arcuate projections 225, 226 may be radiused to provide the same curvature of bearing 16, for example, a radius of between about 1¼ inches and about 3 inches. The shape of arms 210 including projections 225, 226 may ensure that the compressive load applied by press mechanism 44 is transmitted to bearing 16 and not borne by nut 11. Minimizing or preventing contact between extensions 212, 213 and nut 11 also permits nut 11 to be freely rotated without contact with extensions 212, 213.

Press mechanism 44 may include a wrench 230 having teeth 235 engageable with teeth 511 of nut 11 to allow a rotation of nut 11 via a controller controlling a rotation of nut 230. Wrench 230 may surround collar 46 and be extendable away from base 400 toward nut 11 and retractable in an opposite direction. Teeth 235 may engage teeth 511 when wrench 230 is extended to contact nut 11.

Although only two arms 212, 213 are illustrated in FIGS. 3 and 4, according to one aspect of the invention, two or more arms 212, 213 may be mounted to, or otherwise extend from, base 400 of press mechanism 44. For example, three or more extensions arms may be provided, for example, uniformly spaced about base 400 about an axis coaxial to an axis of shaft 14 and/or rod 40. In one aspect of the invention, arms 212, 213 may include spring-loaded mountings to base 400 whereby arms 212, 213 are biased into a position of engagement with race 15. Press mechanism 44 may be any means that is configured to provide a compressive load (e.g., utilizing a nut) to outboard bearing 16 (e.g., an inner race thereof). Further, press mechanism 44 may include a load sensor or any means for monitoring the compressive load transferred to bearing 16. For example, the indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, the dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate controller or processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

In another aspect of the invention, press mechanism 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect, the fluid pressure may comprise the source of compressive load on bearing 16. In such an embodiment, the fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube.

When air is used as the fluid, the air may be provided by conventional "shop air" at a pressure of about 100 psig. The pressure of the fluid in the deformable cavity may be monitored by means of sensor or pressure gage, for example, a pressure gauge mounted to a nozzle inserted the wall of the deformable or non-deformable cavity. In one aspect, a mechanical indicator may be activated, for example, a lever deflected when the desired fluid pressure in press mechanism 44 is reached advising the mechanic.

As discussed previously, press mechanism 44 and rod 40 thereof may be adapted to attach to exposed end 13 of spindle 14. Though this may be effected by many conventional means, including welding and mechanical fasteners, in the aspect of the invention shown in FIGS. 1-4, rod 40 is attached to end 13 of spindle 14 by means of a collar 46. In the aspect shown, collar 46 is mounted to rod 40 by means of internal threads 47 in collar 46 that thread onto external threads 49 on rod 40. Collar 46 also includes a second set of internal threads 45 that engage external threads 51 on spindle 14. In one aspect, only 2 or 3 external threads 51 need be engaged by collar 46. According to one aspect, multiple collars 46 having varying diameters may be provided to accommodate varying diameters of spindle 14. Each of these collars 46 may be adapted to engage external threads 49 on rod 40.

Rod 40, housing 42, collar 46, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 12, as exemplified by a stud 100 in FIGS. 1-3. Nut 11 may be loosened or hand tightened prior to mounting apparatus 20, though any light load on nut 11 will typically be relieved with application of tension to spindle 14 by means of rod 40.

For example, a torque wrench and socket may be utilized to torque nut 11 and seat the bearings. The nut may then be tightened to a "hand tight" position followed by loosening of the nut by backing it off about ¼ turn. Alternatively, such tightening and loosening may be done using servo controlled wrench tools which perform such tasks in response to a command by a user or which may be automatically performed in response to a set of instructions programmed and stored in the controller or a second controller or computer storage coupled to the controller.

Figure 7:
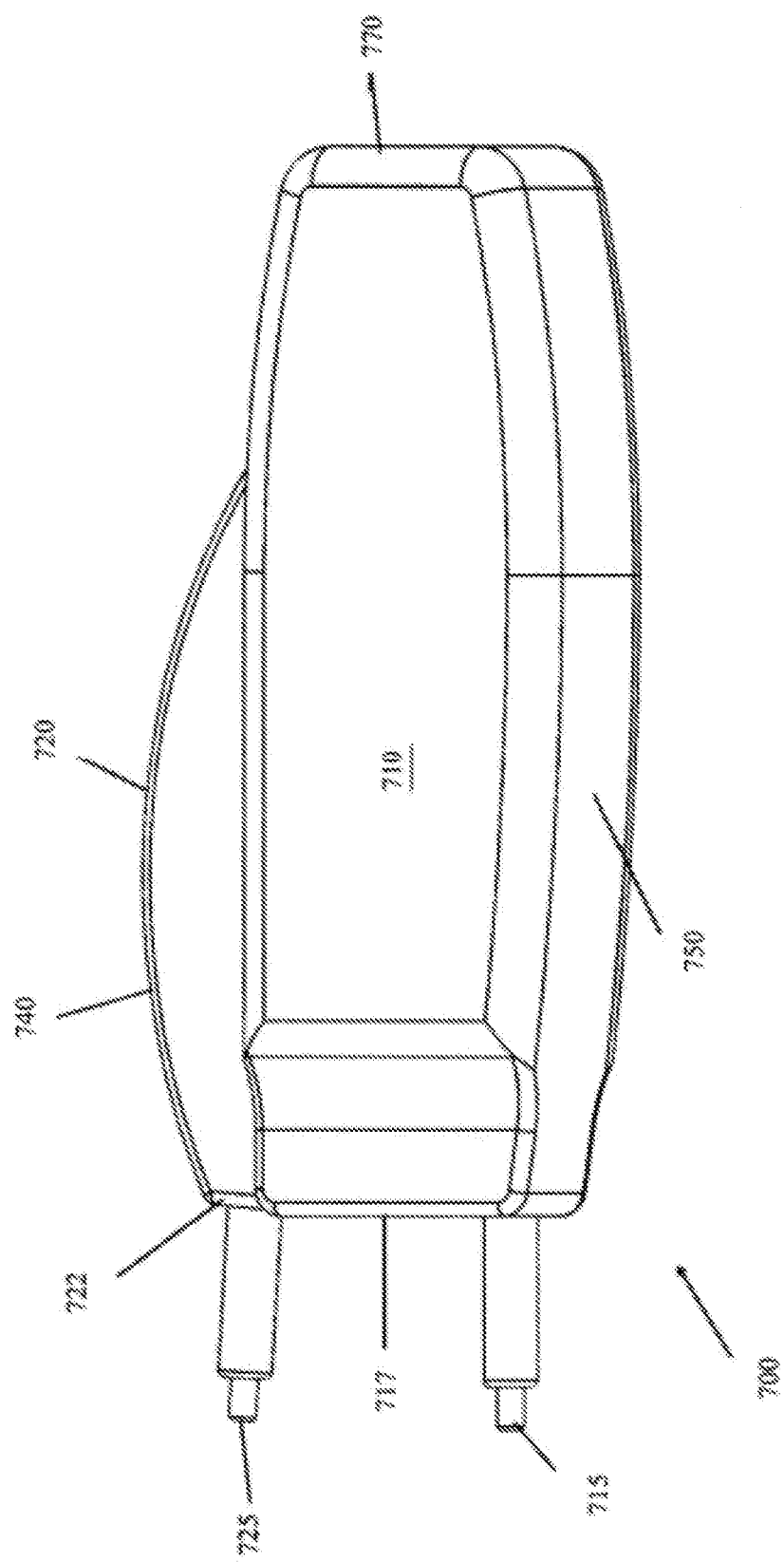
FIG. 7 is a side perspective view of a tool for manipulating the retaining member of FIG. 6.

Apparatus 20 may then be mounted to hub assembly 10 by attaching rod 40 to spindle 14 by means of collar 46. Arms 210 may then be automatically advanced by press mechanism 44 such that the arms are brought into contact with bearing 16 (e.g., an inner race thereof) as depicted in FIGS. 5-7 which a movement of arms 210 toward bearing 16 and around nut 11. FIG. 7 shows a same position of arms 210 as FIG. 3. In one example, press mechanism may then apply 4000 lbs force to bearings.

Such force may be generated and transmitted by press mechanism 44 using any of various mechanisms including those described in co-owned U.S. Pat. No. 8,316,530 relative to press mechanism 44. In one example, the loading of bearing 16 may be initiated by advancing, that is tightening, a nut (such as nut 48 described in the Patent '530), against housing 52 via bearing 62, for example, by means of arms 50. The buildup of pressure in cavity 56 as indicated by pressure indicator 60 may be monitored by the mechanic. The nut may be tightened and loosened manually or by an electronically controlled servo wrench controlled by a controller preprogrammed or operated in real time by a user, for example.

Pressure is applied by press mechanism 44 until a target pressure is achieved. The hub assembly may be rotated at least once to provide proper seating of the rollers in bearing 16. Alternatively, the bearings could be automatically rolled utilizing a separate bearing rolling mechanism not described herein.

A desired preload may then be provided (e.g., automatically controlled by the controller) by press mechanism 44 to the bearings. The controller may cause a servo motor to actuate wrench tools (not shown) and torque the nut (e.g., nut 11) to "finger tight" or a wrench 220 could be controlled by a controller to provide such a preload. If endplay is desired, a servo motor (e.g., coupled to wrench 220 or a separate servo wrench) may back the nut off to a desired endplay setting. Upon completion of the preloading, apparatus 20 may be removed from wheel hub assembly 10 and, keeper 530 and retaining member 540 may be engaged (e.g., using tool 700) with retaining nut 11 and spindle 14 such that keeper teeth 520 engage teeth 511 of nut 11 and engaging member 534 of keeper 530 engage shaft slot 5 of spindle 14.

The preloading of the bearings as described above is advantageous relative to endplate adjustment but was rarely recommended prior to the present invention due to the difficulty of creating and verifying a correct preload site. A load sensor such as a pressure indicator or gauge (not shown) may be used along with the selective positioning of retaining nut 11 on spindle 14 (e.g., using locating laser beams produced by locating optical sending units and markings 510; or wrench controlled by a controller described in co-owned U.S. patent application Ser. No. 15/071,570 filed concurrently herewith provide for a repeatable correct and accurate preload setting.

In another example, press mechanism 44 may apply pressure by fluid pressure to provide the compressive load to bearing 16. In this aspect of the invention, the compressive force provided by the nut may be replaced by fluid pressure provided to press mechanism 44. For example, as depicted in FIGS. 1-4, for example, press mechanism 44 includes a housing 52 and a movable piston 54 mounted for axial movement in housing 52. In this aspect of the invention, an internal cavity 56 is provided in housing 52. Internal cavity 56 is at least partially filled, for example, substantially completely filled, with a fluid, for example, a gas, air, oil, water, and the like, that produces a hydrostatic pressure when fluid pressure is provided to internal cavity 56 receiving piston 54 via a pump (not shown), pressurized shop gas, or otherwise. Such pressure may cause movement of piston 54 which may be mechanically coupled to arms 210 to provide the load to bearing 16. A reduction in such pressure may cause a retraction of piston 54 and a reduction in the load.

In one aspect, the fluid pressure (e.g., to cavity 56 of housing 52 of press mechanism 44) may be provided by a conduit or hose. The hose may supply fluid, for example, hydraulic fluid, from a pressurized supply, for example, a pump controlled by a controller. The fluid supplied to the hose may vary from 500 to 3000 psig, for example.

Such a press mechanism applying pressure by fluid pressure may be used to automatically regulate the compressive load on bearing 16, for example, by regulating the pressure introduced to press mechanism 44 through the hose. In one aspect, the invention may include an automatic controller, for example, a PID controller, personal computer, or PLC controller adapted to regulate the pressure in the hose. For example, the predetermined preload and the parameters of the bearing being loaded may be entered into the controller and, after mounting a rod similar to rod 40, housing 42 and a press mechanism to bearing 16 (e.g., an inner race thereof), the controller may automatically ramp up the fluid pressure to provide the desired preload or to verify an existing preload. This aspect of the invention may be suitable for production line applications, among others.

In one aspect, the fluid provided by the hose may be provided by a pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to the hose. Other sources of high-pressure fluid may be provided according to aspects of the invention.

In an example, press mechanism 44 may include a switch 300 for use in controlling the load on bearing 16. Switch 300 may be in fluid communication with cavity 56 and thereby a source of fluid (e.g., via the hose described above) utilized to provide fluid pressure to apply the load to the bearing. Switch 300 may be coupled to a controller or may include a controller therein to regulate the compressive load on bearing 16, for example, by regulating the pressure (e.g., hydraulic or air) introduced into cavity 56 to drive piston 54 as described above.

When the load and pressure are at a desired condition, nut 11 may be tightened by hand or automatically as described above to "finger tight".

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method for use in providing a load on a bearing mounted to a shaft, the method comprising:
    engaging a lock nut on a shaft at a desired preload of a bearing mounted on the shaft;
    engaging a keeper with the nut to inhibit movement of the keeper relative to the nut;
    engaging the keeper with the shaft to inhibit rotational movement of the nut relative to the shaft;
    engaging a first pin of a first arm of a retaining member tool with a first tool receiving opening of a retaining member connected to the keeper and engaging a second pin of a second arm of the retaining member tool with a second tool receiving opening of the retaining member;
    moving the first arm toward the second arm to deform the retaining member such that opposite member arms of the retaining member move toward each other and the second arm is received in a cavity of the first arm such that an extending portion of the second arm extends outside the cavity and the second arm moves within the cavity;
    a first end of the second arm pivotally connected to the first arm at a first end of the cavity, the second arm extending from the first end of the cavity within the cavity to a second end of the cavity, the second pin extending out of an opening of the cavity at an end of the first arm;
    engaging the retaining member connected to the keeper with the nut to hold the keeper axially such that the keeper is engaged with the nut.

2. The method of claim 1 wherein the moving the first arm and second arm comprises pivotally moving ends of the first arm and second arm toward each other.

3. The method of claim 1 wherein the moving the first arm and second arm comprises moving ends of the first arm and second arm toward each other about a pivot located an opposite end of the first arm relative to the first pin and on an opposite end of the second arm relative to the second pin.

4. The method of claim 3 wherein the pivot comprises a pivot pin located in the cavity.

5. The method of claim 3 wherein the cavity is bounded by inner surfaces of the first arm.

* * * * *